United States Patent
Bening et al.

(10) Patent No.: US 10,053,609 B2
(45) Date of Patent: Aug. 21, 2018

(54) STYRENIC BLOCK COPOLYMERS AS THERMALLY-ACTIVATED VISCOSIFIERS FOR OILFIELD APPLICATIONS

(71) Applicant: KRATON POLYMERS U.S. LLC, Houston, TX (US)

(72) Inventors: Robert C. Bening, Houston, TX (US); Erin Murphy, Houston, TX (US); Carl L. Willis, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 20 days.

(21) Appl. No.: 15/175,486

(22) Filed: Jun. 7, 2016

(65) Prior Publication Data

US 2016/0362593 A1 Dec. 15, 2016

Related U.S. Application Data (60) Provisional application No. 62/174,881, filed on Jun. 12, 2015.

(51) Int. Cl.

| | | |
|---|---|---|
| *C09K 8/035* | (2006.01) | |
| *C09K 8/50* | (2006.01) | |
| *C08G 81/02* | (2006.01) | |
| *C08L 53/02* | (2006.01) | |
| *C08L 91/00* | (2006.01) | |

(52) U.S. Cl.
CPC ............ *C09K 8/035* (2013.01); *C08G 81/02* (2013.01); *C08L 53/025* (2013.01); *C08L 91/00* (2013.01); *C09K 8/50* (2013.01); *C08L 2201/54* (2013.01)

(58) Field of Classification Search
CPC ......... C09K 8/035; C09K 8/50; C08L 53/025; C08L 91/00; C08L 2201/54; C08G 81/02
See application file for complete search history.

(56) References Cited

U.S. PATENT DOCUMENTS

| | | |
|---|---|---|
| RE27,145 E | 6/1971 | Jones |
| 3,595,942 A | 7/1971 | Wald et al. |
| 3,634,549 A | 1/1972 | Shaw |
| 3,670,054 A | 6/1972 | De La Mare et al. |
| 3,700,633 A | 10/1972 | Wald et al. |
| 3,948,845 A | 4/1976 | Marx et al. |
| 4,039,593 A | 8/1977 | Kamienski et al. |
| 4,107,236 A | 8/1978 | Naylor et al. |
| 5,460,739 A | 10/1995 | Rhodes et al. |
| 5,777,031 A | 7/1998 | Djiauw et al. |
| 6,017,854 A | 1/2000 | Van Slyke |
| 6,034,042 A | 3/2000 | Rhodes |
| 6,492,469 B2 | 12/2002 | Willis et al. |
| 7,439,301 B2 | 10/2008 | Handlin, Jr. |
| 7,625,979 B2 | 12/2009 | Atwood et al. |
| 7,863,223 B2 | 1/2011 | Svaboda et al. |
| 8,188,014 B2 | 5/2012 | Svaboda |
| 2008/0319116 A1 | 12/2008 | Fredrickson et al. |
| 2009/0186958 A1* | 7/2009 | St. Clair .................. C08F 8/14 522/39 |
| 2010/0056721 A1 | 3/2010 | Wright et al. |
| 2013/0225020 A1 | 8/2013 | Flood et al. |

FOREIGN PATENT DOCUMENTS

| | | |
|---|---|---|
| WO | 2001094434 A1 | 12/2001 |
| WO | 2015065393 A1 | 5/2015 |

OTHER PUBLICATIONS

PCT International Search Report for PCT/US2016/036185, dated Aug. 29, 2016.

* cited by examiner

*Primary Examiner* — Frances Tischler (74) *Attorney, Agent, or Firm* — Samantha Page; Cantor Colburn LLP (57) ABSTRACT

Provided herein is a dispersion composition comprising a blend of a semi-crystalline, selectively hydrogenated block copolymer and a low polarity fluid for oilfield applications. The block copolymer comprises blocks of semi-crystalline hydrogenated polybutadiene, blocks of poly(mono alkenyl arenes), and blocks of hydrogenated, non-crystalline conjugated dienes. The dispersions can be converted to thixotropic fluids or cohesive gels and find application as insulating packer fluids, fluid loss pills, drilling fluids and completion fluids.

27 Claims, 5 Drawing Sheets

STYRENIC BLOCK COPOLYMERS AS THERMALLY-ACTIVATED VISCOSIFIERS FOR OILFIELD APPLICATIONS

CROSS-REFERENCE TO RELATED APPLICATION

This application claims the benefit of U.S. Provisional Application No. 62/174,881, filed Jun. 12, 2015.

STATEMENT REGARDING FEDERALLY SPONSORED RESEARCH OR DEVELOPMENT

None.

FIELD OF THE INVENTION

The disclosure relates to a dispersion composition containing semi-crystalline, selectively hydrogenated block copolymers and low polarity fluids. The dispersion composition exhibits low viscosity fluid dispersion and is useful in a variety of applications, such as, oilfield applications as a drilling fluid or a completion fluid or an insulating packer fluid.

BACKGROUND

Block copolymers of various structures have been known for some time. Commonly, two or more blocks are combined in a single polymer which possesses different physical and/or chemical character to make a material having properties that are some combination of those individual blocks. In this way, mono-alkenyl arenes and conjugated dienes have been employed as monomers for such blocks prepared by anionic polymerization. The glassy blocks comprising mono-alkenyl arenes provide physical strength and the rubbery blocks comprising conjugated dienes provide an elastomeric character. When arranged in the proper structure such block copolymers, often generically referred to as styrenic block copolymers, form thermoplastic elastomers.

U.S. Pat. No. 3,670,054 to De La Mare et al. disclosed block copolymers that have a reduced sensitivity to organic solvents. In particular the block copolymers disclosed include hydrogenated (polybutadiene-polystyrene-polyisoprene-polystyrene-polybutadiene). In addition to possessing the glassy character of polystyrene and the rubbery character of polyisoprene, these block copolymers also possessed some character typical of semi-crystalline polymers since the hydrogenated polybutadiene blocks resembled polyethylene.

U.S. Pat. No. 4,107,236 to Naylor et al. discloses a hydrogenated block copolymer having the structure low vinyl butadiene block-polystyrene block-hydrogenated medium vinyl butadiene block-polystyrene block-hydrogenated low vinyl butadiene block (lvB-S-mvB-S-lvB). Upon hydrogenation, the low vinyl butadiene blocks (lvB) become semi-crystalline polyethylene and the medium vinyl butadiene block (mvB) becomes ethylene/butylene rubber.

U.S. Pat. Publ. No. 2010/0056721 to Wright et al. discloses selectively hydrogenated linear or radial styrenic block copolymers having terminal semi-crystalline blocks resulting from the hydrogenation of low vinyl butadiene blocks. The block copolymers were used neat or in melt-processed compounds for a variety of film, fiber and molding applications.

Polymeric additives have been used in drilling and well stimulation and completion fluids. The desired rheological characteristics of a hydrocarbon fluid are described in Legget, C. Svaboda, M. Arvie, Jr, R. Horton, J. Zhang, "Oil-Based Insulating Packer Fluids", U.S. Pat. No. 7,863,223, dated Jan. 4, 2011. This packer fluid is a hydrocarbon fluid and a gelling agent. The packer fluid has a yield power law characteristic, and includes a polyamide component.

U.S. Pat. No. 8,188,014 to Svoboda describes a polyamide polymer mixed with oleaginous fluid for use in oilfield application for in-situ solidification in the annular barrier of a well.

Styrenic block copolymers have found a number of applications in drilling, well stimulation and completion. U.S. Pat. No. 6,017,854 to Van Slyke describes oilfield fluids containing styrenic block copolymers in petroleum derived or synthetic hydrocarbon fluid. The styrenic block copolymers are typically SBS or SIS triblock copolymers.

Selectively hydrogenated styrenic diblock copolymers such as polystyrene-hydrogenated polyisoprene (i.e. S-EP) have found application as viscosifiers in oilfield fluids. However, these diblock types of styrenic block copolymers can be difficult to handle because of their tendency to agglomerate into a single mass. This behavior is known as "blocking" and is not to be confused with the "block" character of the copolymers. Blocking refers to the agglomeration of the solid polymer particles. To mitigate this problem, various dusting agents have been applied to the surface of finished diblock copolymer pellets, strands, and crumbs. Usually, significant amounts of these solid dusting agents must be used to exhibit an appreciable effect. Although solids are acceptable in some applications, in many cases it is desirable to avoid the inclusion of solids in oilfield fluids. In order to eliminate all solids, undusted polymers must be used. Such undusted diblock copolymers may exhibit a strong blocking tendency requiring undesirable applications of force to break apart these undusted, agglomerated polymers.

Additionally, the viscosities of oilfield fluids, particularly at lower temperatures, can be quite high. While in specific situations and wellbore locations high viscosities are required, fluids having a high viscosity generally require more energy to be pumped. This can lead to high back pressures which, in turn, can result in formation damage. A fluid that exhibited a high viscosity only after being placed in the desired location in the wellbore but remained as a low viscosity fluid until that time would be especially advantageous for applications such as packer fluids. In this situation, the oilfield fluids would be easily pumpable and would possess the high viscosities required of packer fluids only after being placed into the well at the locations where they are needed.

Thus, it is desirable to produce a block copolymer useful in oilfield fluid applications which did not introduce solid particulates and yet did not block/agglomerate, but remained free-flowing.

SUMMARY

In the broadest sense the disclosure provides a fluid composition for oilfield applications comprising a semi-crystalline, selectively hydrogenated block copolymer having at least one semi-crystalline polyethylene block and a low polarity fluid in which the block copolymer is dispersed to form a low viscosity fluid or is dissolved to form a cohesive gel or a thixotropic fluid.

In one embodiment, the disclosure provides a dispersion composition useful for oilfield drilling and completion fluids comprising a blend of a semi-crystalline, selectively hydrogenated block copolymer having the general formula C-A-B or C-A-B-A-C or (C-A-B)nX wherein C is a hydrogenated block of butadiene having a vinyl content of 15 mol % or less and a molecular weight less than the molecular weight of the A block, A is a mono-alkenyl arene block, B is a hydrogenated polymer block of conjugated diene wherein the vinyl content is greater than 25 mol %, n ranges from 1.5 to 6.0, and X is the residue of a coupling agent, and a low polarity fluid where the blend is a low viscosity fluid containing a dispersed solid phase at 70° F.

The disclosure further provides a cohesive gel comprising a semi-crystalline, selectively hydrogenated block copolymer having the general formula C-A-B-A-C or (C-A-B)$_n$X wherein C is a hydrogenated block of butadiene having a vinyl content of 15 mol % or less and a molecular weight less than the molecular weight of the A block, A is a mono-alkenyl arene block, B is a hydrogenated polymer block of conjugated diene wherein the vinyl content is greater than 25 mol %, n ranges from 1.5 to 6.0, and X is the residue of a coupling agent, and a low polarity fluid where the semi-crystalline, selectively hydrogenated block copolymer is dissolved in the low polarity fluid.

The disclosure further provides a thixotropic fluid comprising a semi-crystalline, selectively hydrogenated block copolymer having the general formula C-A-B wherein C is a hydrogenated block of butadiene having a vinyl content of 15 mol % or less and a molecular weight of less than 20,000 g/mol, A is a mono-alkenyl arene block having a molecular weight of 20,000 g/mol or greater, B is a hydrogenated polymer block of conjugated diene wherein the vinyl content is greater than 25 mol %, and a low polarity fluid wherein the semi-crystalline, selectively hydrogenated block copolymer is dissolved in the low polarity fluid.

The disclosure further provides a process for forming a cohesive gel comprising heating the dispersion composition comprising a selectively hydrogenated block copolymer having the general formula C-A-B-A-C or (C-A-B)$_n$X and a low polarity fluid to a temperature of at least 150° F.

The disclosure further provides a process for forming a thixotropic fluid comprising heating the dispersion composition comprising a semi-crystalline, selectively hydrogenated block copolymer having the general formula C-A-B and a low polarity fluid to a temperature of at least 150° F.

DETAILED DESCRIPTION OF THE INVENTION

The compositions provided herein include block copolymers having the general formula C-A-B, C-A-B-A-C, or (C-A-B)$_n$X in which C is a hydrogenated, low vinyl polybutadiene block and is semi-crystalline, A is a polymer block of a mono-alkenyl arene monomer, and B is a hydrogenated polymer block of conjugated diene monomer having no or little crystallinity, n represents the average number of arms in the radial structure, and X is the residue of a coupling agent.

The C block is semi-crystalline and has the structure of polyethylene. It results from the hydrogenation of a low vinyl content polybutadiene block. 1,3-butadiene monomer can be polymerized by 1,4-addition to yield linear repeat units along the polymer backbone. It can alternately be polymerized by 1,2-addition to yield branched repeat units. Typically, the anionic polymerization techniques employed to make the block copolymers of this invention yield a mixture of 1,4- and 1,2-addition repeat units. For the purpose of this invention, the vinyl content of the C block is defined as the amount of units polymerized by 1,2-addition. In order to make a semi-crystalline C block, polybutadiene blocks of low or no vinyl content are first polymerized and then subsequently hydrogenated in a post-polymerization reaction. Before hydrogenation, the vinyl content of the low vinyl polybutadiene block is less than 15 mol % based on the total number of butadiene repeat units in the block. Because the semi-crystalline character of the C block is essential and the melting point and degree of crystallinity of this block decreases with increasing vinyl content, it is preferred to have a vinyl content of 12 mol % or less and most preferred to have 10 mol % or less. At vinyl contents of 15 mol % or greater the C block is not sufficiently crystalline to provide the advantageous rheology or storage and handling properties of the invention.

The C block is relatively small, having a molecular weight less than the molecular weight of the adjacent A block polymer. The C block must be sufficiently large to have a melting point of at least 165° F. If it is too large, and in particular larger than the A block, the block copolymer will not yield the desired thixotropic fluid or elastic gel, or decrease the thermal stability of the resulting thixotropic fluid or gel. Without being bound by theory, it is believed that the presence of too large of a C block prevents the organization of the A blocks which is responsible for formation of the structured solutions that generate the desired rheology. When the block copolymer is used in thixotropic fluids the molecular weight of the C block is less than 20,000 g/mol and the molecular weight of the A block is at least 20,000 g/mol. When the block copolymer is used in cohesive gels the molecular weight of both the C and A block can be smaller. However, the C block must be smaller than the A block for the reasons already explained. In preferred embodiments where the block copolymer is used in thixotropic fluids the molecular weight of the C block is from 4,000 to less than 20,000 g/mol and in most preferred embodiments it is from 6,000 to 15,000 g/mol. At molecular weights less than 4,000 the C block is too small to express its semi-crystalline character in this embodiment.

The C blocks have a melting point of at least 165° F. In the more preferred embodiments the melting point is at least 175° F. and in the most preferred embodiments the melting point is at least 185° F.

The A block is formed by polymerization of mono-alkenyl arene monomers. The mono-alkenyl arene may be styrene, α-methylstyrene, methylstyrenes other than α-methylstyrene, vinyl toluene, para-butylstyrene, ethylstyrene and vinylnapthalene, and these can be used alone or in combination of two or more. Preferred is styrene. The A block is not hydrogenated during the selective hydrogenation process.

The A block of the semi-crystalline, selectively hydrogenated block copolymer must be sufficiently large to provide a driving force for micelle formation in the low polarity fluid. Further, it must be large enough to provide strength when cohesive gels are formed. The molecular weight of the A block is at least 5,000 g/mol. In preferred embodiments the molecular weight is at least 9,000 g/mol, more preferred is at least 20,000 g/mol, and most preferred is 30,000 to 100,000 g/mol. In all cases, the molecular weight of the A block is greater than that of the C block in any particular semi-crystalline, selectively hydrogenated block copolymer.

The B block is a polymer block of a conjugated diene and has rubbery character. The conjugated diene may be 1,3-butadiene, substituted butadiene such as isoprene, piperylene, 2,3-dimethyl-1,3-butadiene, myrcene, and 1-phenyl-1,3-butadiene or mixtures thereof. Preferred is 1,3-butadiene (herein referred to as butadiene) and isoprene. In all cases, the B block has low or no crystallinity as would be measured by calorimetry. When 1,3-butadiene is the monomer, it is polymerized such that the vinyl content (1,2-addition content) of the B block is at least 25 mol % based on the total number of butadiene repeat units in the block, and in preferred embodiments is at least 30 mol %. When isoprene is the monomer all vinyl contents (3,4-addition contents) normally obtainable by anionic polymerization are useful since its structure does not readily crystallize. The B block is selectively hydrogenated in a post-polymerization reaction.

The molecular weight of the B block of the semi-crystalline, selectively hydrogenated block copolymer should be sufficiently high to provide good thickening efficiency in low polarity fluids. Additionally, higher molecular weights relative to the C and A blocks increases the solubility of the block copolymer in the low polarity fluids. The molecular weight of the B blocks is at least 70,000 g/mol. In preferred embodiments the B block molecular weight is from 75,000 to 200,000 g/mol, more preferred is from 80,000 to 160,000 g/mol, and most preferred is from 90,000 to 150,000 g/mol. It will be understood that in the coupled structures (C-A-B)$_n$X the indicated B block will be half the molecular weight of the above specification. This is because two such B blocks are linked together during the coupling process.

If the intent is to produce a sequential pentablock, it would be preferable to use isoprene to form the non-crystallizable B block. In some cases, it may be desirable to copolymerize styrene and a diene monomer to form the non-crystallizable B block.

As used herein, semi-crystalline refers to blocks having calorimetrically observable melting endotherms. Non-crystalline means blocks having less than 1% crystallinity as determined by calorimetry.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens, make particularly suitable solvents. Frequently used are cyclic alkanes, such as cyclopentane, cyclohexane, cycloheptane, and cyclooctane, all of which are relatively non-polar. Other suitable solvents will be known to one skilled in the art and can be selected to perform effectively in a given set of process conditions, with temperature being one of the major factors taken into consideration.

Anionic polymerizations are initiated by specific compounds that include, but are not limited to, for example, alkyl lithium compounds and other organolithium compounds such as s-butyllithium, n-butyllithium, t-butyllithium, amyllithium and the like. The lithium initiator process is described in, for example, U.S. Pat. Nos. 4,039,593 and Re. 27,145. Where symmetric, linear copolymers are desired, it is possible to use di-initiators such as the di-sec-butyl lithium adduct of m-diisopropenyl benzene. Other such di-initiators are disclosed in U.S. Pat. No. 6,492,469. Of the various polymerization initiators, s-butyllithium is preferred.

The vinyl content of the conjugated diene B block is controlled by addition of a microstructure control agent during polymerization as described in, for example, U.S. Pat. Nos. Re. 27,145, 5,777,031, and 7,439,301. The microstructure control agents are normally polar compounds soluble in the polymerization solvent such as alkyl ethers such as, for example, diethyl ether and 1,2-diethoxypropane. However, any microstructure control agent known in the art and useful for the polymerization of conjugated dienes may be used. The modifier can only be added after all of the low vinyl butadiene segments have been polymerized. When polymerizing isoprene, it is not necessary or desirable to add a microstructure modifier, as the product of hydrogenation of the polymer obtained in the above solvents will not be crystalline.

The blocks of the copolymers provided herein may be polymerized in a linear fashion by sequential addition of the monomers. In such a case, the C-A-B and C-A-B-A-C type structures can be formed. Alternately, radial polymers having the structure (C-A-B)$_n$X can be formed by sequential polymerization of the C-A-B "arms" and them coupling these living arms. Typical coupling agents are disclosed in U.S. Pat. No. 7,625,979 B2 and are alkoxy-silanes of the general formula R$_x$—Si—(OR')$_y$, where x is 0 or 1, x+y=4, R and R' are the same or different, R is selected from aryl, linear alkyl and branched alkyl hydrocarbon radicals, and R' is selected from linear and branched alkyl hydrocarbon radicals. The aryl radicals preferably have from 6 to 12 carbon atoms. The alkyl radicals preferably have 1 to 12 carbon atoms, more preferably from 1 to 4 carbon atoms. Preferred tetra alkoxy silanes are tetramethoxy silane ("TMSi"), tetraethoxy silane ("TESi"), tetrabutoxy silane ("TB Si"), and tetrakis(2-ethylhexyloxy)silane ("TEHSi"). Preferred trialkoxy silanes are methyl trimethoxy silane ("MTMS"), methyl triethoxy silane ("MTES"), isobutyl trimethoxy silane ("IBTMO") and phenyl trimethoxy silane ("PhTMO"). Of these the more preferred are tetraethoxy silane and methyl trimethoxy silane.

The statistical coupling described herein leads to a distribution of arm numbers (n). The expressed generic values of n represent the average of such a distribution which is made of a collection of species having n=1, 2, 3, etc. In practice, some proportion of the living arms remain uncoupled (n=1 or unreacted with coupling agent). The coupling efficiency of such a radial polymer is defined as the percentage of living arms incorporated into species having n=2 or greater.

Hydrogenation can be carried out via any of the several hydrogenation or selective hydrogenation processes. For example, such hydrogenation has been accomplished using methods such as those described in, for example, U.S. Pat. Nos. 3,595,942; 3,634,549; 3,670,054; 3,700,633; and Re.

27,145. Hydrogenation may be carried out under such conditions that at least about 90% of the conjugated diene double bonds have been reduced, and between zero and 10% of the arene double bonds have been reduced. Preferred ranges are at least about 95% of the conjugated diene double bonds reduced, and more preferably at least about 98% of the conjugated diene double bonds are reduced.

The molecular weights referred to herein may be measured with gel permeation chromatography (GPC) using polystyrene calibration standards, such as is done according to ASTM D5296. GPC is a method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights, also referred to as apparent molecular weights. The styrene equivalent molecular weight may be converted to true molecular weight when the styrene content of the polymer and the vinyl content of the diene segments are known. The detector used is preferably a combination ultraviolet and refractive index detectors. The molecular weights expressed herein are measured at the peak of the GPC trace and are commonly referred to as "peak molecular weights". The molecular weights of the individual blocks are determined by difference: the molecular weight of the C block ($M_C$) is measured after its polymerization, then the molecular weight of the C-A diblock ($M_{CA}$) is measured after its polymerization and so on. For example, the molecular weight of the A block is then determined as $M_A = M_{CA} - M_C$. This difference can be calculated from styrene equivalent molecular weights and then the true molecular weights of each block calculated by the conversion mentioned herein. Alternately, the true molecular weights of each homopolymer block, diblock, triblock, etc. can be first determined by conversion of the styrene equivalent molecular weights and then the difference can be calculated. The first method is preferred. Unless otherwise specified, the term "molecular weights" refers to the true molecular weight in g/mol of the polymer or block of the copolymer.

Preferable low polarity fluids include mineral oil, low toxicity synthetic oil such as ESCAID® 110 (Exxon Mobil Corp.), or paraffinic fluids such as Linpar® 1416 (Sasol Corp.) and SARALINE®185V (Shell Trading Int. Ltd.), or an internal olefin such as AlphaPlus® C1618 (Chevron Phillips Chemical Co.) with low toxicity synthetic oil, paraffinic oil and internal olefin fluids being most preferred as they have the least tendency to prematurely dissolve the polymer and also provide a higher service temperature than mineral oils. Suitable mineral oils may be naphthenic- or paraffinic-based. Under some circumstances more polar fluids such as diesel, biodiesel and carboxylic acid esters such as 2-ethylhexyl oleate may yield suitable results but these are more likely to prematurely dissolve the polymer or result in fluids that undergo severe viscosity loss at too low of a temperature. Preferred internal olefin hydrocarbons are $C_{16}$-$C_{18}$ hydrocarbons.

The dispersions described herein may include a semi-crystalline, selectively hydrogenated block copolymer in a low polarity fluid. The composition and structure of the semi-crystalline, selectively hydrogenated block copolymer are critical in determining whether dispersion can be formed and the rheological properties of any such dispersion. While the applicants do not wish to be bound by theory, it is thought that such dispersions are formed because of the different solubilities of the C, A, and B blocks in the low polarity fluid and because of the semi-crystalline nature of the C block. At lower temperatures the semi-crystalline block inhibits dissolution of the polymer, so that the polymer can be dispersed in the non-polar medium, and remains largely undissolved. At this point, the viscosity is determined by the viscosity of the oil. Upon heating, the polymer dissolves. Due to the lower solubility of the A block in such fluids, structured solutions are formed. In the case of C-A-B structures, this results in a micelle structure of the block copolymer in the fluid. The C blocks are less soluble and formed a collapsed core. The B blocks, however, are chosen so as to be readily soluble in the non-polar fluid. At this point the B block copolymer segment becomes more greatly solvated by the fluid, resulting in a "corona" comprised of highly-extended chain; the resulting micelle structures impart thixotropic character to the fluid. In structures that possess A blocks linked by a B segment, such as C-A-B-A-C or $(C-A-B)_nX$, a similar process occurs, resulting in a cohesive, elastic gel; the collapsed structures formed by the C blocks act as physical cross-links to form a three-dimensional network.

With regard to the storage and handling properties and the reduced tendency of the semi-crystalline, selectively hydrogenated block copolymer to block or agglomerate, it is thought that the C block presents a significantly non-tacky character to the surface of the solid block copolymer. As in the case of the dispersion, this character is associated with the presence of the C block and is maintained at temperatures well below the melting point of the C block.

At 70° F. the dispersions presented herein are a low viscosity fluid. By low viscosity fluid is meant less than 300 centipoise (cP), preferably less than 150 cP, most preferable less than 50 cP.

The preferred process for preparing dispersions of the block copolymer in the low polarity fluid for applications such as insulating packer fluids may include the addition of the solid polymer to the fluid while mixing under conditions suitable for efficiently distributing and suspending the polymer. The temperature should be maintained at no more than about 85° F. and preferably at 70° F. or lower. The dispersion will contain up to about 10 wt. % of the semi-crystalline, selectively hydrogenated block copolymer in mineral oil, alkyl paraffin fluid or internal olefin fluid. Preferred dispersions will contain 2 to 10 wt. % of the semi-crystalline, selectively hydrogenated block copolymer and more preferred ones will contain 4 to 8 wt. %. Formation of the dispersion is best accomplished using a rotor-stator type high shear mixer. However, any mixing apparatus capable of producing sufficient shear to uniformly disperse the block copolymer may be used. Mixing times may be as short as about 15 minutes.

Optionally, a soluble A-B diblock copolymer may be added to improve the stability of the dispersion where the A block is a polymer block of monoalkenyl arene and the B block is a polymer block of conjugated diene. The monoalkenyl arene and the conjugated dienes are as previously described herein. The block molecular weights and monoalkenyl arene content of the A-B diblock can vary independently from the A and B blocks of the semi-crystalline, selectively hydrogenated block copolymer. In particular, the A-B diblock has a monoalkenyl arene content of 25 to 50 wt. % based on the total mass of the diblock copolymer and a total styrene equivalent molecular weight of 125,000 to 250,000 g/mol. Up to 50 wt. % of the block copolymer comprising the dispersion composition may be diblock copolymer. Inclusion of such an A-B diblock copolymer is optional. In many embodiments of the present invention the preferred dispersion is free of added A-B diblock copolymer.

Addition of any diblock can be done by pre-dissolving the diblock polymer in the fluid or by adding it with the selectively hydrogenated, semi-crystalline block copolymer provided that the diblock copolymer is also in an easily dispersible or soluble form. The diblock may be dissolved first by heating the mixture of the diblock and fluid and then cooling before the addition of the selectively hydrogenated, semi-crystalline block copolymer.

Any A-B diblock copolymer added to the dispersion is done so at such a concentration as to enhance the dispersion of the semi-crystalline, selectively hydrogenated block copolymer during transport and while in storage while not contributing excessively to the dispersion viscosity. In particular, addition of A-B diblock copolymers may prevent settling of the dispersed semi-crystalline, selectively hydrogenated block copolymer when the dispersion is in a static or quiescent state such as in storage before use or when not flowing in a well bore. In this way pumpability and product uniformity is preserved.

When the semi-crystalline, selectively hydrogenated block copolymer structure has two or more A blocks separated by a B block, as in the C-A-B-A-C and $(C-A-B)_nX$ structures, a cohesive gel may be formed from the dispersion. The cohesive gel is elastic in character and will retain its shape under the force of gravity. Such a gel is differentiated from a thixotropic fluid by having a high elastic modulus when characterized by oscillatory shear rheometry. At conditions where the gel structure is intact such gels will not flow and cannot be pumped. They are not fluid.

The cohesive gels may be formed by heating the dispersion to a temperature of at least 150° F. In preferred embodiments this conversion is conducted at temperatures of at least 175° F. and in most preferred embodiments as temperatures of at least 200° F. Conversion of the dispersion to a cohesive gel is not reversible. Once the cohesive gel is formed, the low viscosity dispersion state cannot be reformed without significant change of the composition, for example, by addition of new components such as polar or aromatic solvents or by degradation of the block copolymer or fluid by some physical or chemical process.

When the semi-crystalline, selectively hydrogenated block copolymer has a single A block, as in the C-A-B structures, thixotropic fluids may be formed. Thixotropic fluids are generally shear-thinning fluids or greases. Quantitatively, thixotropic fluids are defined as having Fann Dial Reading Values of at least 10 lbs/100 ft$^2$ at 3 RPM and at least 15 lbs/100 ft$^2$ at 6 RPM, and preferably having Herschel-Bulkley rheology with a Tau(0) of at least 5 lbs/100 ft$^2$. Tau(0) values in the range of 10 to 105 lbs/100 ft$^2$ are preferred in insulating packer fluid applications. It is thought that fluid convection is not initiated until such values of Tau(0) are reached. As such, the thixotropic fluids of the present disclosure will suppress undesirable heat transfer due to convection in oil wells.

The thixotropic fluids may be formed by heating the dispersions to a temperature of at least 150° F. In preferred embodiments this conversion is conducted at temperatures of at least 175° F. and most preferred at least 200° F. Conversion of the dispersion to a thixotropic fluid is irreversible. Once the thixotropic fluid is formed the low viscosity dispersion state cannot be reformed without significant change of the composition, for example, by addition of new components such as polar or aromatic solvents or by degradation of the block copolymer or fluid by some physical or chemical process.

The dispersions, cohesive gels, and thixotropic fluids described herein may be used in a variety of oilfield applications. In particular, the dispersions capable of forming thixotropic fluids can be used as insulating packer fluids or to temporarily suspend/abandon a well. In both applications the low viscosity of the dispersion is maintained until the dispersion reaches an elevated temperature after which time a rheology profile consistent with utility as an insulating packer fluid or well suspension fluid is maintained.

Dispersions capable of forming cohesive gels may be useful in applications where there is no intent to subsequently displace the gel in any work-over process. Examples of such applications are fluid loss pills and gellants for mud trapped behind a well-bore casing.

EXAMPLES

Four C-A-B type block copolymers were prepared where C was a selectively hydrogenated low vinyl polybutadiene block, A was a polystyrene block and B was a selectively hydrogenated polyisoprene block. The characteristics of the blocks are shown in Table 1. The diblock copolymer AB1 was composed of a polystyrene A block and a selectively hydrogenated polyisoprene B block.

TABLE 1

| Sample | C Block MW (g/mole) | C Block Vinyl Content (mol %) | A Block MW (g/mole) | B Block MW (g/mole) |
|---|---|---|---|---|
| CAB1 | 7,500 | 8 | 37,000 | 104,000 |
| CAB2 | 14,000 | 8 | 33,000 | 92,000 |
| CAB3 | 15,000 | 8 | 80,000 | 109,000 |
| CAB4 | 13,000 | 8 | 90,000 | 142,000 |
| AB1 | None | None | 36,000 | 96,000 |

Example 1

Blocking Performance

The extent to which the products would be expected to block and agglomerate during storage was measured as described. The polymer was packed into a cylindrical mold, and a weight designed to simulated the pressure experienced by the product in a bag at the bottom of a stack 6 feet high (100 lb/ft$^2$) was placed on top of the cylinder, and the cylinder was held at 110° F. for 7 days. The mold was removed and the force needed to break the resulting "puck" was measured. By convention, samples that broke with ≤150 lbs/ft$^2$ received a rating of "1" (very favorable), samples that broke with 150-300 lbs/ft$^2$ received a rating of "2", samples that broke with 300-1,000 lbs/ft$^2$ received a rating of "3" and samples that required >1,000 lbs/ft$^2$ received a rating of "4" (undesirable). The comparative undusted diblock, AB1, required a breaking force of 790 lbs/ft$^2$.

TABLE 2

| Sample | Blocking Force (lbs./ft$^2$) | Blocking Rating |
|---|---|---|
| CAB1 | 330 | 3 |
| CAB2 | 258 | 2 |
| CAB3 | 248 | 2 |
| CAB4 | 248 | 2 |
| AB1 | 790 | 3 |

The response of oilfield fluids to shear and temperature was measured using a so-called Fann-type viscometer. In the case of the present examples, an OFITE™ Model 900 viscometer was used to collect shear stress data (reported as Fann Dial Reading values) at various shear rates (RPMs) at 70° F. and 150° F. Dial readings in excess of about 285 lbs/100 ft² measured using an F1 spring correspond to the maximum shear stress reading for this instrument configuration; these readings are not valid and are not reported. Where specified, an instrument with a B1 bob and an F2 spring was used to measure the rheology. This configuration extended the measurable shear stress range (DR) range to about 350 lbs/100 ft². Where sufficient data was available, the dial readings were used to calculate the Plastic Viscosity (PV=DR600−DR300; cP) and Yield Point (YP=PV−DR300; lbs/100 ft²); 10 second and, in some cases 10 minute, gel strength values were also measured and reported in units of lbs/100 ft². High values of the Plastic Viscosity and high shear stress values at 300 RPM are considered indicative of a fluid that is difficult to pump. The 300 RPM readings in the tables below correspond to the viscosities of the fluid in cP. The potential of a fluid to perform in an applications such an insulating packer fluids that requires high viscosity at low shear rates is often evaluated based on the 3 RPM and 6 RPM Fann Dial Readings; these dial readings should be at least about 10 lbs/100 ft² and 15 lbs/100 ft², respectively, at the temperature of interest for such an application. CAB1 had a C block with a molecular weight of 7,500 g/mole and an A-B structure otherwise similar to AB1. CAB1 had a substantially lower blocking force than AB1 in the standard test. The reduction in blocking force was from 790 lbs/ft² to 330 lbs/ft². Surprisingly, when the size of the C block was increased to about 14,000 g/mole (CAB2), not only was the blocking force further decreased to about 260 lbs/ft², but the solubility of the polymer in hydrocarbon base fluids (mineral oil, $C_{16}$-$C_{18}$ internal olefin, alkyl paraffin or a blend of two or more of these) typically used in oilfield applications was decreased to such an extent that a relatively low viscosity, stable dispersion of the polymer could be prepared by mixing at ambient temperature. A C-A-B polymer where B was a hydrogenated butadiene block with a high enough vinyl content to prevent crystallinity would be expected to behave in the same manner. The (C-A-B)$_n$X coupled block copolymer having a C molecular weight of 4,600 g/mol and a vinyl content of 8 mol %, an A block of polystyrene having a molecular weight of 9,000 g/mol, and a B block of hydrogenated butadiene having a molecular weight of 41,000 g/mol and a vinyl content of 35 mol % before hydrogenation had the same surprising result with respect to solubility.

Example 2

Thixotropic Fluids of C-A-B Block Copolymers in Mineral Oil

Figure 1:
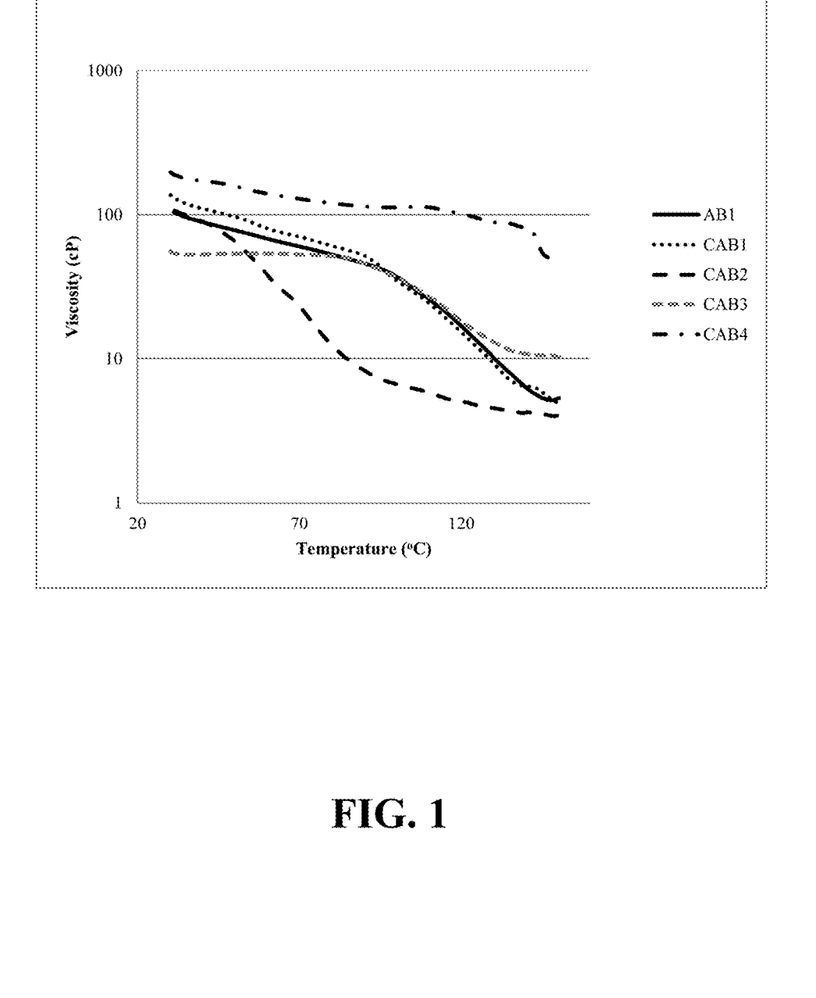
FIG. 1 is a graph of viscosity versus temperature at 500 s$^{-1}$ for 4 wt. % solutions of certain polymers in Escaid® 110 mineral oil.

Unless otherwise specified, the initial samples were prepared by adding the polymer to the specified base fluid at room temperature and mixing with a Silverson™ high shear mixer at 2,000-4,000 RPM for just enough time to disperse the polymer, taking care to avoid heating the solution. Solutions were initially prepared at 4 wt. % polymer in mineral oil (Escaid® 110). Under these conditions, the polymer with the shortest C block, CAB1, was found to dissolve to a viscous solution exhibiting a hazy, blue tint. The polymer with the longest isoprene block, CAB4 also dissolved to yield a very viscous solution, while polymers CAB2 and CAB3 formed dispersions exhibiting some viscosity and bluish tint, but remained pourable after standing at room temperature for several weeks. To complete the dissolution of the polymer, the fluid was transferred into a pressure cell; the headspace was purged with nitrogen by filling to 50 psi and venting at least twice, and then pressurized to 50 psi with nitrogen. The samples were aged while rolling at 200° F. for 16 hours. The viscosity of samples after aging was measured as a function of temperature at a shear rate of 500 s$^{-1}$ using an Ares G2 rheometer (couette cell). The viscosity was measured as the sample was heated from 30° C. to 150° C. (86° F. to 302° F.). This data is shown in FIG. 1. The curve for a fluid prepared from AB1 is shown for comparison. The fluid prepared from CAB1 exhibited nearly the same curve as the AB1 diblock. The fluid prepared from CAB2 began to lose viscosity at a much lower temperature. Losing viscosity at this low of a temperature may significantly limit the utility of the polymer in oilfield applications. The fluid prepared from CAB3 exhibited a stable viscosity until about 90° C. (194° F.). The thermal stability of CAB4 (having the highest overall molecular weight and largest styrene block) was even greater, exhibiting a significant viscosity loss only well above 120° C. (248° F.).

Table 3 summarizes the Fann data for solutions of polymer CAB2 in the range of 4-8 wt. % in Escaid 110. The dispersions formed up to 6 wt. % exhibited viscosity that was favorable for pumping. The 3 and 6 RPM Fann values of the thixotropic fluids formed by heating these dispersions were relatively low, even at 70° F. At 8 wt. % concentration the viscosity of the dispersion is within the pumpable range. The 3 and 6 RPM values of these higher concentration fluids fall off when measured at 150° F., consistent with poor thermal stability.

Table 4 summarizes the Fann data for fluids comprising CAB3. Even at the highest concentrations (8 wt. %), the viscosity remained low (300 RPM Fann DR=102) prior to heating and converting the dispersions to the thixotropic fluid state. The 3 and 6 RPM dial readings remained in the range useful for packer fluid applications up to 120° F. for the 8 wt. % solution. This data shows that it is possible to prepare readily-pumpable dispersions of the C-A-B polymers in mineral oil that convert to thixotropic fluids having high low-shear rheology at useful oilfield application temperatures.

TABLE 3

| Polymer | CAB2 | CAB2 | CAB2 | CAB2 | CAB2 | CAB2 | CAB2 | CAB2 |
|---|---|---|---|---|---|---|---|---|
| Fluid | Escaid 110 | Escaid 110 | Escaid 110 | Escaid 110 | Escaid 110 | Escaid 110 | Escaid 110 | Escaid 110 |
| Concentration (wt %) | 6% | 8% | 4% | 4% | 5% | 5% | 8% | 8% |
| Aging Temp (° F.) | BHR (70) | BHR (70) | AHR (200) | AHR (200) | AHR (200) | AHR (200) | AHR (200) | AHR (200) |
| Test Temp (° F.) | 70 | 70 | 70 | 150 | 70 | 150 | 70 | 150 |
| RPM[1] | DR | DR | DR | DR | DR | DR | DR | DR |
| 3 | 0.1 | 5.7 | 2.2 | 0.3 | 5.8 | 0.8 | 63 | 15.5 |
| 6 | 0.6 | 11.6 | 4.6 | 0.5 | 11.5 | 1.6 | 96 | 26.0 |
| 100 | 16 | 143 | 52 | 10.8 | 104.5 | 26.3 | — | 162 |
| 200 | 32 | 231 | 85 | 19.6 | 169 | 48.1 | — | — |

TABLE 3-continued

| | | | | | | | | |
|---|---|---|---|---|---|---|---|---|
| 300 | 42 | — | 113 | 28 | 223 | 65.0 | — | — |
| 600 | 74 | — | 182 | 51 | — | 112 | — | — |
| PV (cP) | 32 | — | 69 | 23 | — | 47 | — | — |
| YP (lbs./100 ft$^2$) | 10 | — | 44 | 5 | — | 18 | — | — |

[1] B1 bob, F1 spring

TABLE 4

| Polymer | CAB3 | CAB3 | CAB3 | CAB3 | CAB3 | CAB3 | CAB3 | CAB3 |
|---|---|---|---|---|---|---|---|---|
| Fluid | Escaid 110 | Escaid 110 | Escaid 110 | Escaid 110 | Escaid 110 | Escaid 110 | Escaid 110 | Escaid 110 |
| Concentration (wt %) | 6% | 6% | 6% | 6% | 8% | 8% | 8% | 8% |
| Aging Temp (° F.) | BHR (70) | AHR (200) | AHR (200) | AHR (200) | BHR (70) | AHR (200) | AHR (200) | AHR (200) |
| Test Temp (° F.) | 70 | 70 | 120 | 150 | 70 | 70 | 120 | 150 |
| RPM[1] | DR | DR | DR | DR | DR | DR | DR | DR |
| 3 | 0.2 | 10.7 | 6.3 | 4.1 | 0.9 | 31 | 15.3 | 10.7 |
| 6 | 0.5 | 19.4 | 12.2 | 8.5 | 2.2 | 51 | 27.4 | 20.1 |
| 100 | 13.1 | 132 | 95 | 75 | 38 | — | 190 | 148 |
| 200 | 26.5 | 210 | 147 | 117 | 70.5 | — | — | 235 |
| 300 | 38.0 | 275 | 191 | 150 | 102 | — | — | — |
| 600 | 70.0 | — | 296 | 236 | 179 | — | — | — |
| 10 sec. gel (lb/100 ft$^2$) | 0.0 | 12 | 7 | 5.0 | 1 | 32 | 16 | 12 |
| 10 min. gel (lb/100 ft$^2$) | 0.0 | 11 | 7 | 5.0 | 1 | 33 | 16 | 12 |
| PV (cP) | 32.0 | — | 106 | 85 | 77 | — | — | — |
| YP (lb/100 ft$^2$) | 6.1 | — | 85 | 65 | 26 | — | — | — |

[1] B1 bob, F1 spring

Example 3

Thixotropic Fluids Comprising C-A-B Block Copolymers in Alkyl Paraffin Fluid

Figure 2:
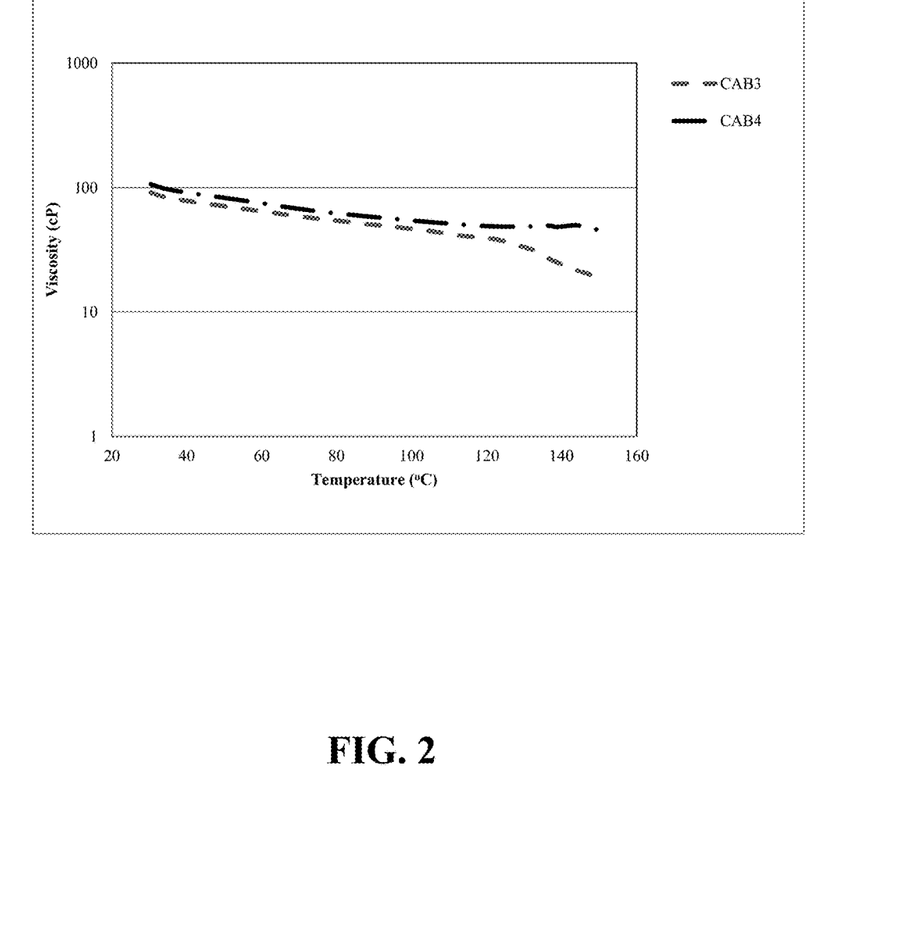
FIG. 2 is a graph of viscosity versus temperature at 500 s$^{-1}$ for 4 wt. % solutions of certain polymers in Linpar® 1416 alkyl paraffin fluid.

Dispersions containing 4 wt. % of CAB3 and CAB4 were prepared in Linpar 1416 (a linear alkyl paraffin fluid). Both CAB3 and CAB4 formed stable dispersions in this low polarity fluid. There was little evidence of polymer dissolution as evidenced by insignificant increase in fluid viscosity and no formation of blue tint. This state persisted on storage for several days at room temperature. It was noted, however, that the block copolymer particles tended to settle on standing; noticeable settling had occurred within a few hours. When aged overnight at 200° F. in a roller oven both suspensions were converted to a thixotropic fluid. The viscosity profiles as a function of temperature are shown in FIG. 2. The temperature for the onset of rapid viscosity loss was about 120° C. (248° F.) for the fluid containing CAB3, and at least about 150° C. (302° F.) for CAB4; the slope of the curve remained fairly constant up 150° C., the temperature limit of the test. The Fann rheology of the 4 wt. % dispersions at 70° F. and the thixotropic fluids at 70° F., 120° F. and 150° F. are listed in Table 5. Prior to conversion, dispersion of both CAB3 and CAB4 exhibited very low Fann numbers. These viscosities are comparable to that of the oil itself. Following conversion, these fluids exhibited favorable rheological properties. The 3 and 6 RPM values were well within the useful application range across the entire temperature range, i.e. ≥10 lb/100 ft$^2$ at 3 RPM and ≥15 lb/100 ft$^2$ at 6 RPM. The data in FIG. 2 suggests that the low RPM values would remain in this range to much higher temperatures. All of the Fann data profiles for the converted thixotropic fluids exhibited Herschel-Bulkley rheology. In practice this means the fluid is shear-thinning with the shear stresses extrapolated to a non-zero value at a shear rate of zero. The zero-shear rate values, Tau(0), are listed in Table 5.

TABLE 5

| Polymer | CAB3 | CAB3 | CAB3 | CAB3 | CAB4 | CAB4 | CAB4 | CAB4 |
|---|---|---|---|---|---|---|---|---|
| Fluid | Linpar 1416 | Linpar 1416 | Linpar 1416 | Linpar 1416 | Linpar 1416 | Linpar 1416 | Linpar 1416 | Linpar 1416 |
| Concentration (wt %) | 4% | 4% | 4% | 4% | 4% | 4% | 4% | 4% |
| Aging Temp. (° F.) | BHR(70) | AHR (200) | AHR (200) | AHR (200) | BHR(70) | AHR (200) | AHR (200) | AHR (200) |
| Test Temperature (° F.) | 70 | 70 | 120 | 150 | 70 | 70 | 120 | 150 |
| RPM[1] | DR | DR | DR | DR | DR | DR | DR | DR |
| 3 | 0.1 | 21 | 17.8 | 16.8 | 0.1 | 34.0 | 31.0 | 25.4 |
| 6 | 0.5 | 25.4 | 21.6 | 20.2 | 0.3 | 41.3 | 37.2 | 30.4 |
| 100 | 3.1 | 66 | 53 | 49 | 5 | 116 | 95 | 72 |
| 200 | 4.5 | 88 | 69 | 63 | 10 | 162 | 128 | 95 |
| 300 | 7 | 106 | 81 | 73 | 15 | 199 | 155 | 113 |
| 600 | 14.2 | 157 | 106 | 94 | 29 | 281 | 210 | 154 |
| 10 sec. gel (lb/100 ft$^2$) | 0 | 21 | 19 | 18 | 0.0 | 35 | 32 | 27 |

TABLE 5-continued

| | | | | | | | |
|---|---|---|---|---|---|---|---|
| 10 min. gel (lb/100 ft$^2$) | 0 | 21 | 19 | 18 | 0.0 | 35 | 32 | 27 |
| PV (cP) | 8 | 51 | 24 | 21 | 14.0 | 82 | 55 | 41 |
| YP (lb/100 ft$^2$) | 0 | 54 | 57 | 52 | 0.6 | 118 | 100 | 73 |
| Tau(0) (lb/100 ft$^2$) | — | 18.7 | 6.6 | 5.8 | — | 20.3 | 16.3 | 17.7 |

[1]B1 bob, F1 spring

Example 4

Thixotropic Fluids Comprising C-A-B Polymers in C1618 Internal Olefin Fluid

Figure 3:
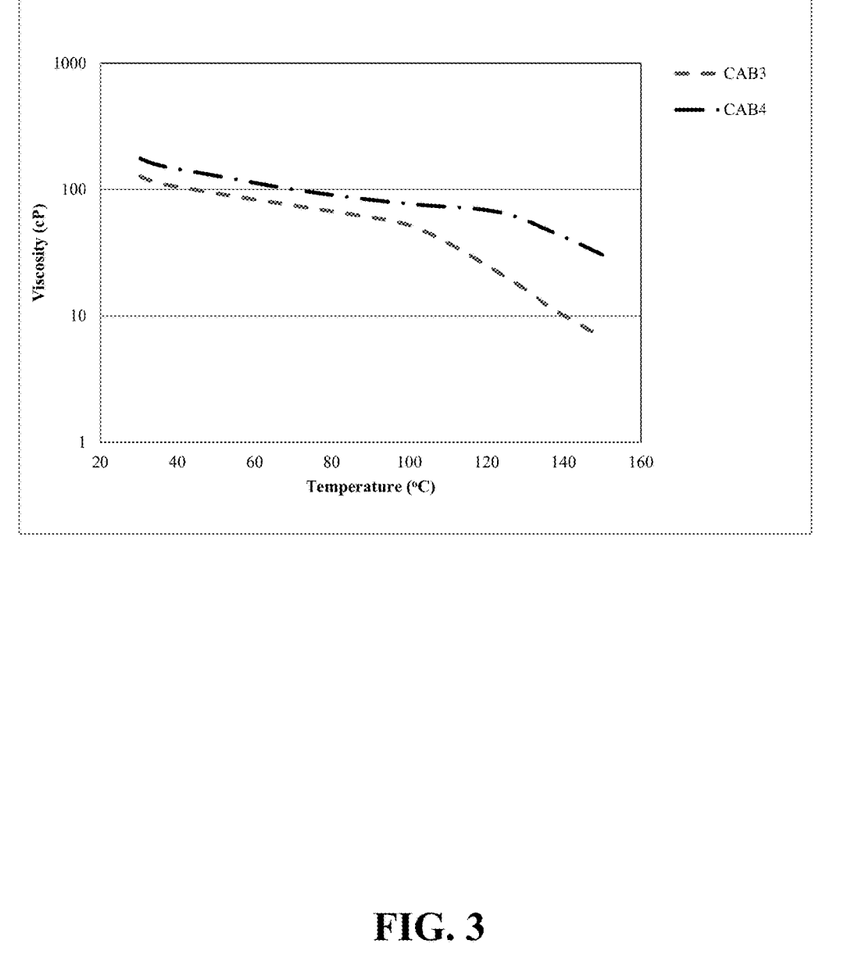
FIG. 3 is a graph of viscosity versus temperature at 500 s$^{-1}$ for 4 wt. % solutions of certain polymers in AlphaPlus® C1618 internal olefin fluid.

Dispersions containing 4 wt. % of CAB3 and CAB4 were prepared in AlphaPlus® C1618 (an internal olefin fluid). Both CAB3 and CAB4 formed dispersions in this low polarity fluid. There was little evidence of polymer dissolution as evidenced by insignificant increase in viscosity and no blue tint. This state persisted on storage for several days at room temperature. It was noted, however, that the block copolymer particles tended to settle after standing for more than a couple of hours. When aged overnight at 200° F. in a roller oven both dispersions converted to a thixotropic fluid. The viscosity profiles as a function of temperature are shown in FIG. 3. The temperature for the onset of rapid viscosity loss occurred at about 100° C. (212° F.) for the fluid containing CAB3, and about 130° C. (266° F.) for the fluid containing CAB4. This was a lower temperature than in the alkyl paraffin, but a higher temperature than in mineral oil. The Fann rheology of the dispersions at 70° F. and the thixotropic fluids at 70° F. and 150° F. are listed in Table 6. Prior to conversion, dispersions of both CAB3 and CAB4 exhibited very low Fann numbers. These viscosities are comparable to that of the oil itself. Following conversion, the fluids exhibited favorable rheological properties. The shear stresses remained low at 600 RPM. The 3 and 6 RPM values were well within the useful application range, i.e. ≥10 lb/100 ft$^2$ at 3 RPM and ≥15 lb/100 ft$^2$ at 6 RPM, across the entire temperature range. The data in FIG. 3 suggests that the low RPM values would remain relatively high to at least 200° F. for CAB3, and possibly approaching 250° F. for CAB4. All of the Fann data profiles for the converted thixotropic fluids exhibited Herschel-Bulkley rheology. The low Tau(0) values at 150° F. suggested that a somewhat higher polymer concentration could be useful in this fluid.

Example 5

Figure 4:
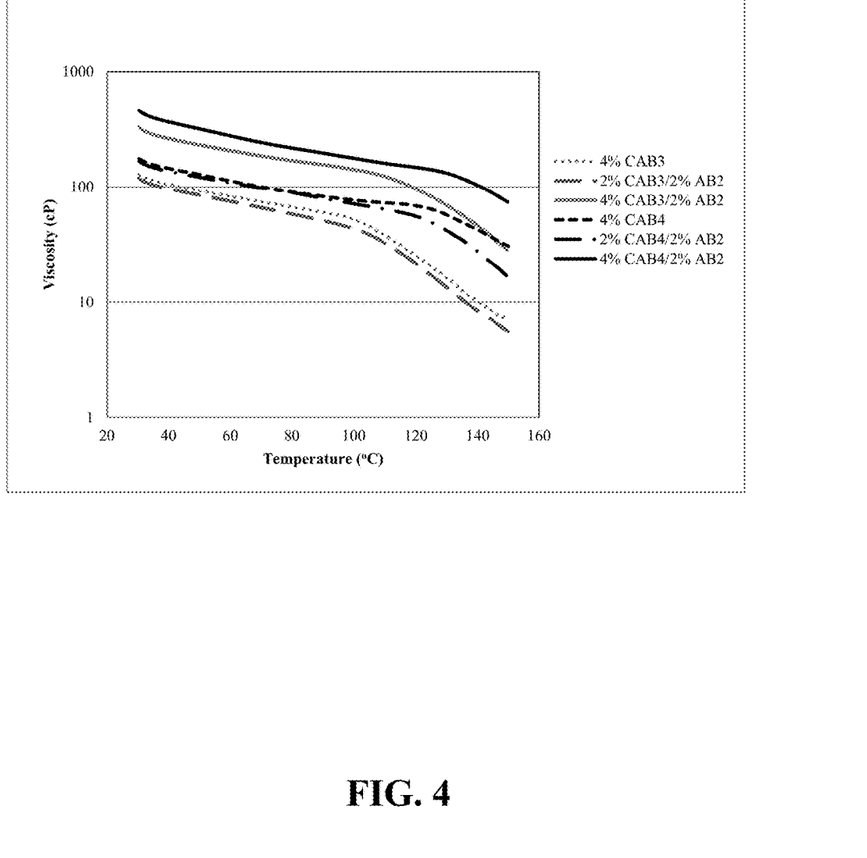
FIG. 4 is a graph of viscosity versus temperature at 500 s$^{-1}$ for 4 wt. % solutions of C-A-B/A-B blends in AlphaPlus® C1618 internal olefin fluids.

Thixotropic Fluids Comprising Blends of C-A-B and A-B Polymers in C1618 Internal Olefin Fluid Dispersions were prepared with a total of 4 wt. % or 6 wt. % of a copolymer consisting of blends of either CAB3 and AB2 or CAB4 and AB2. These were compared to 6 wt. % fluids comprising AB2 alone, also prepared by mixing at room temperature. The data is shown in Tables 7 and 8, respectively. The A-B (AB2) polymer used in this example had an A block composed of polystyrene, a B block composed of selectively hydrogenated polyisoprene, a styrene-equivalent molecular weight of about 227,000 g/mole (for the total AB2 molecule) and a polystyrene content of about 44 wt. %. The Fann values at high RPM demonstrated that the polymer blends exhibited significantly lower viscosities prior to heating than the comparative 6 wt. % AB2 fluid. The fluid of AB2 alone generated shear stress values above the range of the viscometer at ≥200 RPM. These fluids exhibited no visible evidence of settling after standing for several hours. All of the fluids were aged for 16 hours under static conditions at 200° F. All of the blends produced uniform fluids. There was no evidence of a separated low viscosity oil layer. The resulting fluids also exhibited relatively high 3 and 6 RPM Fann values up to 150° F. The blends exhibited Tau(0) values in the target range at 150° F. (except for the 4 wt. % total polymer blend based on CAB3). FIG. 4 compares the viscosity as a function of temperature of the blended fluids to that of the fluids containing only C-A-B polymers. The addition of AB2 had no effect on the onset temperature for rapid viscosity loss in the fluids based on CAB3. The onset temperature of rapid viscosity loss was only slightly reduced in the case of CAB4/AB2 blends. Based on these results it is reasonable to expect that blends could be produced with Tau(0) values in the preferred range

TABLE 6

| Polymer | CAB3 | CAB3 | CAB3 | CAB4 | CAB4 | CAB4 |
|---|---|---|---|---|---|---|
| Fluid | AlphaPlus C1618 | AlphaPlus C1618 | AlphaPlus C1619 | AlphaPlus C1618 | AlphaPlus C1618 | AlphaPlus C1619 |
| Concentration (wt %) | 4% | 4% | 4% | 4% | 4% | 4% |
| Aging Temp (° F.) | BHR(70) | AHR(200) | AHR(200) | BHR(70) | AHR(200) | AHR(200) |
| OFITE configuration | B1F1 | B1F1 | B1F1 | B1F1 | B1F1 | B1F1 |
| Test Temp (° F.) | 70 | 70 | 150 | 70 | 70 | 150 |
| RPM | DR | DR | DR | DR | DR | DR |
| 3 | 0.2 | 19.2 | 14.3 | 0.2 | 29.3 | 15.8 |
| 6 | 0.3 | 24.0 | 18.0 | 0.6 | 37.2 | 23.0 |
| 100 | 2.6 | 67.7 | 50.4 | 6.4 | 115.7 | 67.6 |
| 200 | 5.1 | 94.3 | 66.7 | 13.2 | 168.6 | 91.4 |
| 300 | 7.6 | 117.8 | 78.6 | 18.5 | 211.7 | 108.8 |
| 600 | 15.9 | 177.9 | 103.8 | 34.9 | — | 148.5 |
| 10 sec. gel (lb/100 ft$^2$) | 0 | 21 | 14 | 0.0 | 30 | 16 |
| 10 min. gel (lb/100 ft$^2$) | 0 | 21 | 14 | 0.0 | 30 | 16 |
| PV (cP) | 8.3 | 60.1 | 25.3 | 16.4 | — | 39.6 |
| YP (lb/100 ft$^2$) | 0.0 | 57.7 | 53.3 | 2.1 | — | 69 |
| Tau(0) lb/100 ft$^2$ | — | 16.2 | 2.3 | — | 13.5 | 4.3 | at temperatures up to at least 250° F. in a typical internal olefin fluid, and possibly up to 300° F. or higher in an alkyl paraffin.

TABLE 7

| Fluid | LVT-200 | AlphaPlus C1618 | AlphaPlus C1618 | LVT-200 | AlphaPlus C1618 | AlphaPlus C1618 | LVT-200 | AlphaPlus C1618 | AlphaPlus C1618 |
|---|---|---|---|---|---|---|---|---|---|
| CAB | NA | CAB3 | CAB3 | NA | CAB3 | CAB3 | NA | CAB3 | CAB3 |
| % wt CAB3 | NA | 2% | 4% | NA | 2% | 4% | NA | 2% | 4% |
| % wt AB2 | 6% | 2% | 2% | 6% | 2% | 2% | 6% | 2% | 2% |
| BSA/ASA | BSA | BSA | BSA | ASA(200) | ASA (200) | ASA (200) | ASA(200) | ASA (200) | ASA (200) |
| OFITE configuration | B1F1 | B1F1 | B1F1 | B1F2 | B1F1 | B1F2 | B1F2 | B1F1 | B1F2 |
| Test Temperature (° F.) | 70 | 70 | 70 | 70 | 70 | 70 | 150 | 150 | 150 |
| RPM | DR | DR | DR | DR | DR | DR | DR | DR | DR |
| 3 | 95.7 | 0.1 | 0.6 | 17.2 | 15.1 | 34.5 | 0.9 | 10.9 | 24.4 |
| 6 | 113.3 | 0.4 | 1.1 | 24.0 | 19.5 | 41.1 | 4.1 | 14.3 | 28.9 |
| 100 | 273.4 | 8.9 | 19.3 | 93.0 | 61.1 | 95.5 | 6.6 | 43.8 | 62.4 |
| 200 | — | 17.2 | 36.5 | 152.6 | 85.9 | 141.1 | 7.9 | 59.3 | 79.4 |
| 300 | — | 24.3 | 51.6 | 195.1 | 104.8 | 170.0 | 6.1 | 70.5 | 93.0 |
| 600 | — | 43.8 | 90.1 | 299.3 | 154.4 | 237.3 | 7.5 | 94.4 | 131.4 |
| 10 sec. gel | 68 | 0.0 | 0.0 | 13.0 | 15.0 | 37.0 | 3.0 | 10.0 | 24.0 |
| 10 min. gel | 95 | 0.0 | 1.0 | 12.0 | 16.0 | 37.0 | 2.0 | 11.0 | 24.0 |
| PV (cP) | — | 19.5 | 38.5 | 104.2 | 49.6 | 67.2 | 1.5 | 23.9 | 38.4 |
| YP (lb/100 ft$^2$) | — | 4.8 | 13.1 | 90.9 | 55.2 | 102.8 | 4.6 | 46.6 | 54.6 |
| Tau(0) lb/100 ft$^2$ | — | — | — | 17 | 9.4 | 23.9 | 7.1 | 0.4 | 22.5 |

TABLE 8

| Fluid | LVT-200 | AlphaPlus C1618 | AlphaPlus C1618 | LVT-200 | AlphaPlus C1618 | AlphaPlus C1618 | LVT-200 | AlphaPlus C1618 | AlphaPlus C1618 |
|---|---|---|---|---|---|---|---|---|---|
| CAB | NA | CAB4 | CAB4 | NA | CAB4 | CAB4 | NA | CAB4 | CAB4 |
| % wt CAB4 | NA | 2% | 4% | NA | 2% | 4% | NA | 2% | 4% |
| % wt AB2 | 6% | 2% | 2% | 6% | 2% | 2% | 6% | 2% | 2% |
| BSA/ASA | BSA | BSA | BSA | ASA(200) | ASA (200) | ASA (200) | ASA(200) | ASA (200) | ASA (200) |
| OFITE configuration | B1F1 | B1F1 | B1F1 | B1F2 | B1F1 | B1F2 | B1F2 | B1F1 | B1F2 |
| Test Temperature (° F.) | 70 | 70 | 70 | 70 | 70 | 70 | 150 | 150 | 150 |
| RPM | DR | DR | DR | DR | DR | DR | DR | DR | DR |
| 3 | 95.7 | 0.4 | 2.8 | 17.2 | 24.8 | 39.9 | 10.9 | 16.7 | 24.4 |
| 6 | 113.3 | 0.9 | 5.6 | 24.0 | 30.9 | 49.4 | 14.1 | 20.8 | 29.9 |
| 100 | 273.4 | 14.6 | 53.0 | 93.0 | 91.9 | 166.8 | 56.6 | 56.4 | 67.1 |
| 200 | — | 26.9 | 91.0 | 152.6 | 130.7 | 230.5 | 77.9 | 75.8 | 93.0 |
| 300 | — | 37.6 | 124.4 | 195.1 | 161.7 | 276.5 | 96.1 | 90.1 | 122.9 |
| 600 | — | 65.2 | 205.0 | 299.3 | 242.4 | 353.5 | 147.5 | 120.8 | 169.1 |
| 10 sec. gel | 68 | 0.0 | 3.0 | 13.0 | 27.0 | 36.0 | 13.0 | 18.0 | 25.0 |
| 10 min. gel | 95 | 0.0 | 3.0 | 12.0 | 27.0 | 37.0 | 12.0 | 18.0 | 25.0 |
| PV (cP) | — | 27.6 | 80.6 | 104.2 | 80.8 | 77.0 | 51.5 | 30.6 | 46.2 |
| YP (lb/100 ft$^2$) | — | 10.0 | 43.8 | 90.9 | 80.9 | 199.5 | 44.6 | 59.5 | 76.7 |
| Tau(0) lb/100 ft$^2$ | — | — | — | 17 | 19.0 | NA | 7.1 | 6.2 | 15.2 |

Example 6

Cohesive Gel Comprising (C-A-B)$_n$X Polymer in Alkyl Paraffin Fluid

Figure 5:
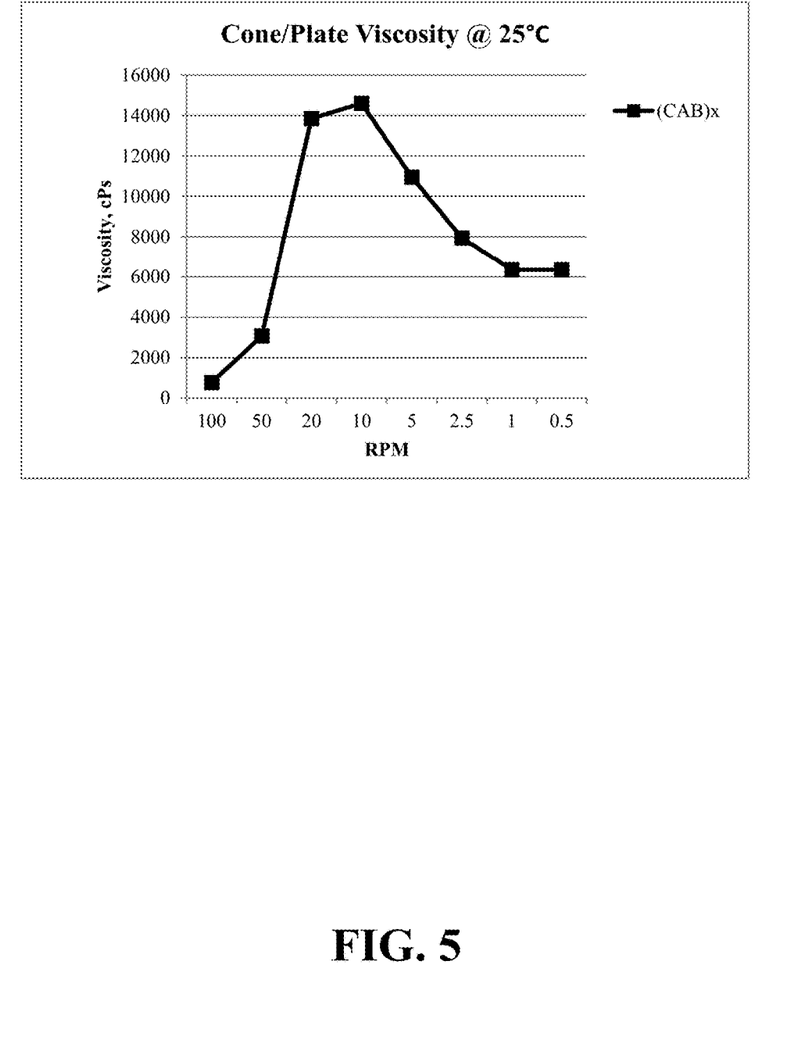
FIG. 5 is a graph of cone and plate viscosity of a gel formed after heating a 6 wt. % solution of (C-A-B)$_n$X polymer in Saraline® 185V synthetic paraffin oil.

A (C$_{4.6}$-A$_9$-B$_{41}$)$_2$X block copolymer was prepared by the general process outlined in the description of the invention (the subscript values after C, A, and B indicate the molecular weight in kg/mol). The C block was a selectively hydrogenated, low vinyl polybutadiene block, the A block was a styrene block, and the B block was a selectively hydrogenated polybutadiene block. Polymerization of the C block proceeded without a modifier and had a vinyl content of about 8 mol %. A modifier was added to increase the vinyl content of the butadiene during the polymerization of the B block and the resulting vinyl content was about 35 mol %. A linear coupling agent was added, so that the majority of the chains are represented by the above structure where n=2. In particular, the polymer is composed primarily of the C$_{4.6}$-A$_9$-B$_{82}$-A$_9$-C$_{4.6}$ species. Dispersions with 6 wt. % of this polymer in mineral oil (Escaid® 110) or an alkyl paraffin fluid (Saraline® 185V) were prepared. The Fann data for fluids prior to conversion to the cohesive gel state are listed in Table 9. Dispersions were formed in both fluids and both had low viscosities at 300 RPM. The viscosity of the mineral oil-based dispersion increased on standing at room temperature overnight indicating some dissolution of the polymer. In the paraffin-based system, no increase in viscosity was observed indicating little or no dissolution. When hot-roll aged at 200° F., both dispersions converted to loose gels. The products were too cohesive to load into a viscometer with a concentric cylinder arrangement like a Fann-type viscometer. The viscosity of the gel produced from the dispersion in Saraline® 185V was measured using a Brookfield viscometer with a cone and plate attachment. The resulting viscosity vs. shear rate curve measured at room temperature is shown in FIG. 5. The viscosity increases with increasing RPMs until about 20 RPM, at which point the gel structure begins to break down. This behavior demonstrated that the converted fluid was a weak gel. A higher concentration of the polymer would likely yield gels with greater cohesive strength. Also, higher molecular weights of the C and/or A block within the limitations presented herein would yield gels of greater cohesive strength.

TABLE 9

| Fluid | Escaid 110 | Saraline 185V |
|---|---|---|
| (C – A – B)$_n$X | AMS 768 | AMS 768 |
| % wt (C – A – B)$_n$X | 6% | 6% |
| BHR/AHR | BHR | BHR |
| OFITE Configuration | B1F1 | B1F1 |
| Test Temperature (° F.) | 70 | 70 |
| RPM | DR | DR |
| 3 | 0.8 | 1.0 |
| 6 | 1.8 | 2.2 |
| 100 | 18.3 | 16.7 |
| 200 | 28.9 | 29.4 |
| 300 | 45.6 | 49.9 |
| 600 | 119.7 | 120.5 |
| 10 sec. gel | 0 | 1 |
| 10 min. gel | 2 | 2 |
| PV (cP) | 74.1 | 70.6 |

Thus it is apparent that there has been provided, in accordance with the present disclosure, a dispersion composition, a cohesive gel, a thixotropic fluid, a process for forming a cohesive gel, and a process for forming a thixotropic fluid that fully satisfies the objects, aims, and advantages set forth above. While specific embodiments have been described herein, it is evident that many alternatives, modifications, and variations will be apparent to those skilled in the art in light of the foregoing description. Accordingly it is intended to embrace all such alternatives, modifications and variations as fall within the spirit and broad scope of the appended claims.

We claim:

1. A dispersion composition for oilfield applications, the composition comprising a blend of:
   a selectively hydrogenated block copolymer having the general formula C-A-B or C-A-B-A-C or (C-A-B)$_n$X wherein
   C is a semi-crystalline hydrogenated block of butadiene having a vinyl content of 15 mol % or less before hydrogenation and a molecular weight of 7,500 to 15,000 grams per mole,
   A is a mono-alkenyl arene block having a molecular weight of 30,000 to 100,000 grams per mole,
   B is a non-crystalline, hydrogenated polymer block comprising conjugated diene and having a molecular weight of at least 70,000 grams per mole,
   n ranges from 1.5 to 6.0, and
   X is the residue of a coupling agent, and
   a low polarity fluid,
   wherein said blend is a low viscosity fluid dispersion having a viscosity of no greater than 500 cP at 70° F.

2. The dispersion composition of claim 1 wherein the mono-alkenyl arene is styrene.

3. The dispersion composition of claim 1 wherein the conjugated diene of the B block is butadiene or isoprene or a mixture thereof.

4. The dispersion composition of claim 3 wherein the conjugated diene is butadiene and the vinyl content is greater than 25 mol %.

5. The dispersion composition of claim 1 wherein the low polarity fluid is selected from the group consisting of mineral oils, alkyl substituted paraffin fluids, internal olefin fluids, or mixtures thereof.

6. The dispersion composition of claim 1 wherein the semi-crystalline, selectively hydrogenated block copolymer has the general formula C-A-B.

7. The dispersion composition of claim 1 wherein the semi-crystalline, selectively hydrogenated block copolymer has the general formula C-A-B-A-C or (C-A-B)$_n$X.

8. The dispersion composition of claim 1 wherein the C block of the semi-crystalline, selectively hydrogenated block copolymer has a vinyl content of 10 mol % or less.

9. The dispersion composition of claim 1 wherein said blend comprises from 4 to 10 wt. % of the selectively hydrogenated block copolymer and 90 to 96 wt. % of the low polarity fluid.

10. The dispersion composition of claim 1 wherein the selectively hydrogenated block copolymer comprises up to 50 wt. % of a diblock copolymer having the general formula A-B wherein A is a mono-alkenyl arene block and B is a hydrogenated conjugated diene block.

11. A cohesive gel for oilfield applications, the cohesive gel comprising:
    a semi-crystalline, selectively hydrogenated block copolymer having the general formula C-A-B-A-C or (C-A-B)$_n$X wherein C is a semi-crystalline, hydrogenated block of butadiene having a vinyl content of 15 mol % or less before hydrogenation and a molecular weight of 7,500 to 15,000 grams per mole, A is a mono-alkenyl arene block having a molecular weight of 30,000 to 100,000 grams per mole, B is a non-crystalline, hydrogenated polymer block comprising conjugated diene and having a molecular weight of at least 70,000 grams per mole, n ranges from 1.5 to 6.0, and X is the residue of a coupling agent, and
    a low polarity fluid
    wherein the semi-crystalline, selectively hydrogenated block copolymer is dissolved in the low polarity fluid.

12. The cohesive gel of claim 11 wherein the mono-alkenyl arene is styrene.

13. The cohesive gel of claim 11 wherein the conjugated diene is butadiene or isoprene or a mixture thereof.

14. The cohesive gel of claim 13 wherein the conjugated diene is butadiene and the vinyl content is greater than 25 mol %.

15. The cohesive gel of claim 11 wherein the low polarity fluid is selected from the group consisting of mineral oils, alkyl substituted paraffin fluids, internal olefin fluids, or mixtures thereof.

16. The cohesive gel of claim 11 wherein the C block of the semi-crystalline, selectively hydrogenated block copolymer has a vinyl content of 10 mol % or less.

17. The cohesive gel of claim 11 wherein said blend comprises from 4 to 10 wt. % of the semi-crystalline, selectively hydrogenated block copolymer and 90 to 96 wt. % of the low polarity fluid.

18. A thixotropic fluid for oilfield applications, the thixotropic fluid comprising:
    a semi-crystalline, selectively hydrogenated block copolymer having the general formula C-A-B wherein C is a semi-crystalline, selectively hydrogenated block of butadiene having a vinyl content of 15 mol % or less before hydrogenation and a molecular weight of 7,500 to 15,000 grams per mole, A is a monoalkenyl arene block having a molecular weight of 30,000 to 100,000 grams per mole, B is a non-crystalline, hydrogenated polymer block comprising conjugated diene and having a molecular weight of at least 70,000 grams per mole, and
    a low polarity fluid
    wherein the semi-crystalline, selectively hydrogenated block copolymer is dissolved in the low polarity fluid.

19. The thixotropic fluid of claim 18 wherein the mono-alkenyl arene is styrene.

20. The thixotropic fluid of claim 18 wherein the conjugated diene is butadiene or isoprene or a mixture thereof.

21. The thixotropic fluid of claim 20 wherein the conjugated diene is butadiene and the vinyl content is greater than 25 mol %.

22. The thixotropic fluid of claim 18 wherein the low polarity fluid is selected from the group consisting of mineral oils, alkyl substituted paraffin fluids, internal olefin fluids, or mixtures thereof.

23. The thixotropic fluid of claim 18 wherein the C block of the semi-crystalline, selectively hydrogenated block copolymer has a vinyl content of 10 mol % or less.

24. The thixotropic fluid of claim 18 wherein the B block of the semi-crystalline, selectively hydrogenated block copolymer has a vinyl content of at least 30 mol %.

25. The thixotropic fluid of claim 18 wherein said blend comprises from 4 to 10 wt. % of the semi-crystalline, selectively hydrogenated block copolymer and 90 to 96 wt. % of the low polarity fluid.

26. A process for forming a cohesive gel comprising heating the dispersion composition of claim 7 to a temperature of at least 150° F.

27. A process for forming a thixotropic fluid comprising heating the dispersion composition of claim 6 to a temperature of at least 150° F.

* * * * *